United States Patent
Yang et al.

(10) Patent No.: US 10,841,766 B2
(45) Date of Patent: Nov. 17, 2020

(54) METHOD AND SYSTEM FOR SERVICE PROVISIONING BASED ON MULTI-TIERED NETWORKS AND RESOURCE UTILIZATION

(71) Applicant: Verizon Patent and Licensing Inc., Arlington, VA (US)

(72) Inventors: Jin Yang, Orinda, CA (US); Sagiv Draznin, Walnut Creek, CA (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 24 days.

(21) Appl. No.: 16/202,694

(22) Filed: Nov. 28, 2018

(65) Prior Publication Data

US 2020/0169856 A1 May 28, 2020

(51) Int. Cl.
| | | |
|---|---|---|
| *G06F 15/173* | (2006.01) | |
| *H04W 4/50* | (2018.01) | |
| *H04L 29/08* | (2006.01) | |
| *H04L 12/26* | (2006.01) | |
| *H04L 12/927* | (2013.01) | |

(52) U.S. Cl.
CPC ............. *H04W 4/50* (2018.02); *H04L 43/16* (2013.01); *H04L 47/803* (2013.01); *H04L 67/18* (2013.01); *H04L 67/327* (2013.01)

(58) Field of Classification Search
CPC .............. H04L 9/3297; H04L 41/0816; H04L 63/0807; H04L 67/10; H04L 45/70; H04L 67/18; H04W 4/20; H04W 8/22; H04W 36/26; G06F 9/45533; G06F 16/2246
See application file for complete search history.

(56) References Cited

U.S. PATENT DOCUMENTS

| | | | | |
|---|---|---|---|---|
| 2014/0099938 | A1* | 4/2014 | Calo | G06F 16/2246 455/422.1 |
| 2014/0282986 | A1* | 9/2014 | Leung | H04L 63/0807 726/9 |
| 2015/0365819 | A1* | 12/2015 | Zhu | H04W 8/22 455/418 |
| 2017/0086118 | A1* | 3/2017 | Vrzic | H04W 36/26 |
| 2018/0191563 | A1* | 7/2018 | Farmanbar | H04L 41/0816 |
| 2018/0248787 | A1* | 8/2018 | Rajagopal | H04L 45/70 |
| 2018/0310150 | A1* | 10/2018 | Cuevas Ramirez | H04W 4/20 |
| 2019/0020657 | A1* | 1/2019 | Egner | H04L 9/3297 |
| 2019/0140919 | A1* | 5/2019 | Smith | H04L 67/10 |
| 2019/0141610 | A1* | 5/2019 | Sabella | G06F 9/45533 |
| 2020/0036814 | A1* | 1/2020 | Muscariello | H04L 67/18 |

* cited by examiner

*Primary Examiner* — Dustin Nguyen

(57) ABSTRACT

A method, a device, and a non-transitory storage medium are described in which multi-tiered networks and resource utilization-based provisioning service is provided. A multi-tiered mobile edge computing network that includes multiple mobile edge computing networks that are multi-tiered based on distance from a network edge includes a network device that selects a location to provision an application service for an end device based on a total resource utilization value and a performance metric associated with one or multiple candidate mobile edge computing networks.

20 Claims, 12 Drawing Sheets

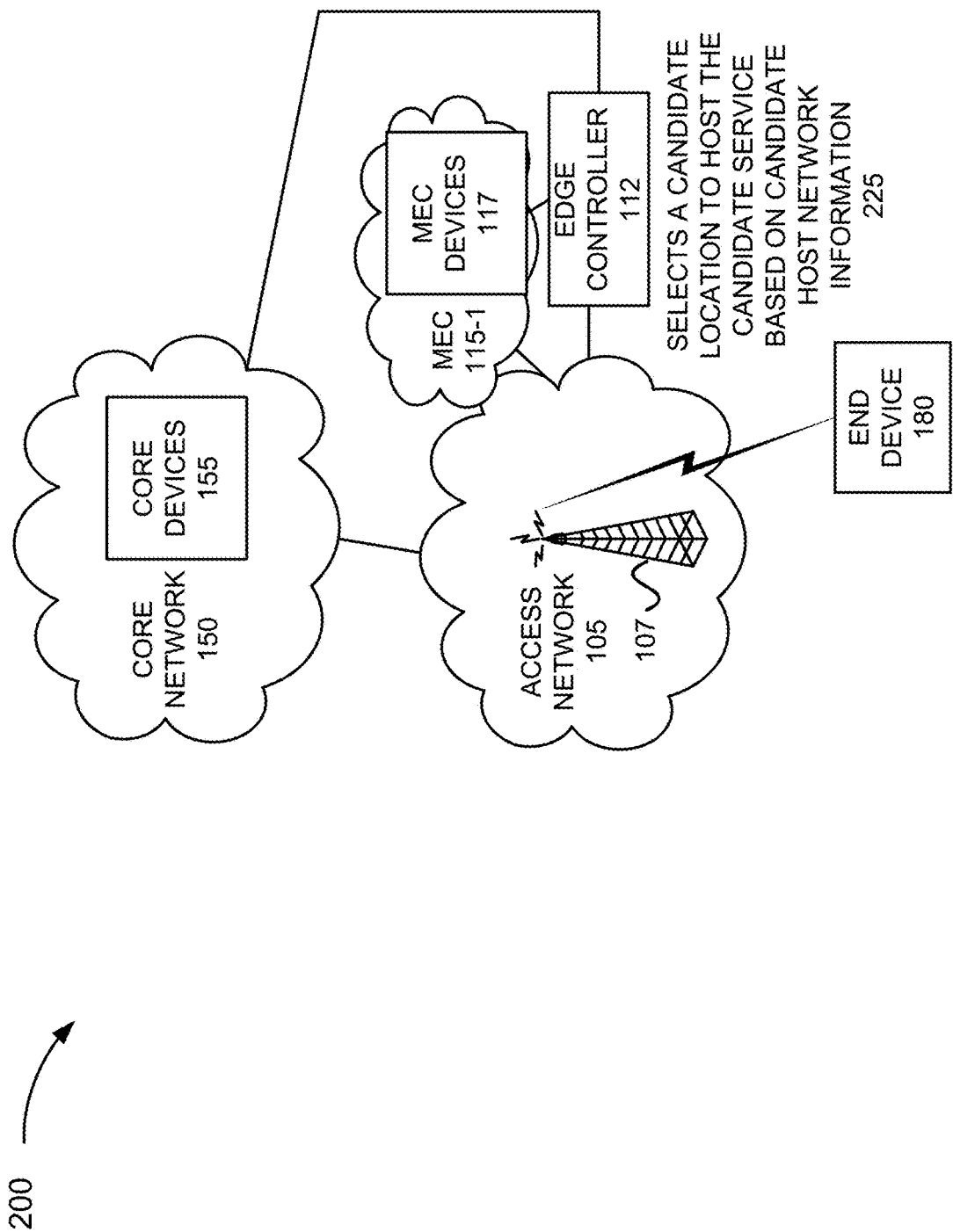

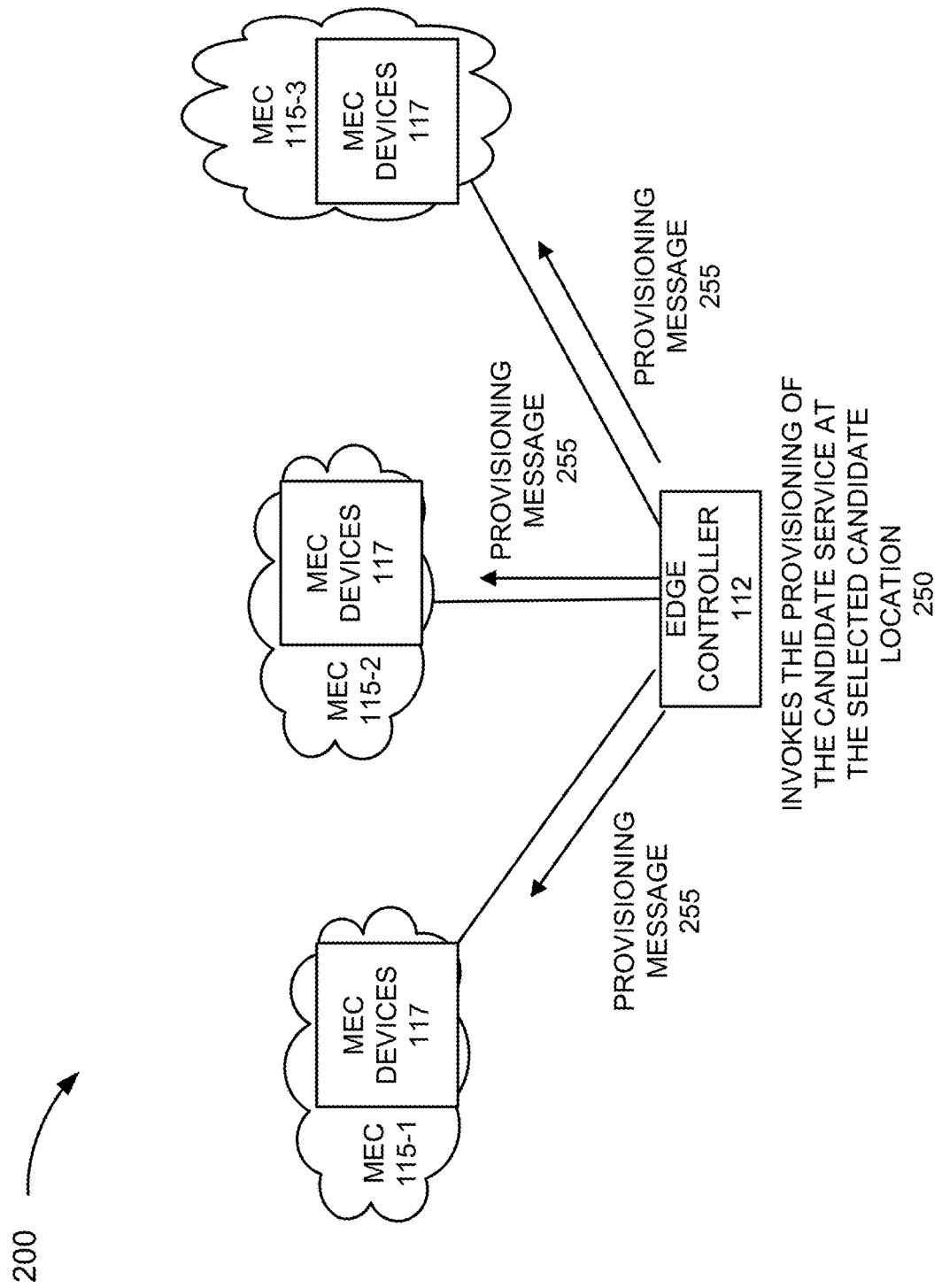

US 10,841,766 B2

METHOD AND SYSTEM FOR SERVICE PROVISIONING BASED ON MULTI-TIERED NETWORKS AND RESOURCE UTILIZATION

BACKGROUND

Multi-access Edge Computing (MEC) (also known as mobile edge computing) is being explored in which core network capabilities (e.g., computational, storage, etc.) are situated at the network edge to improve latency and reduce traffic being sent to a core network. Additionally, other technologies, such as cloud computing, software defined networking (SDN), etc., are also being explored to provision services and applications to various end devices and end users.

BRIEF DESCRIPTION OF THE DRAWINGS

FIGS. 2A-2H are diagrams illustrating exemplary processes of exemplary embodiments of the multi-tiered networks and resource utilization-based provisioning service;

DETAILED DESCRIPTION OF PREFERRED EMBODIMENTS

Figure 1:
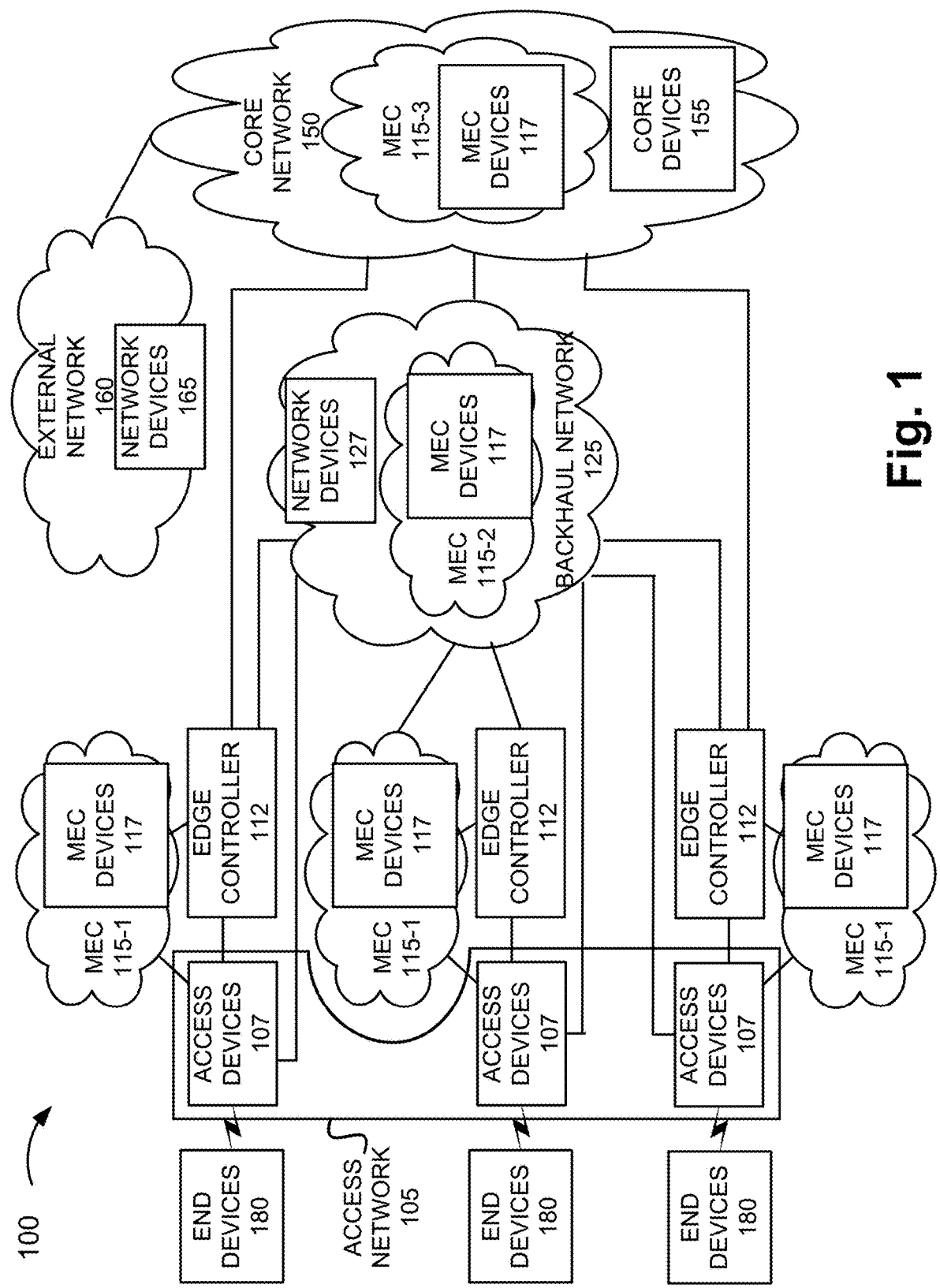
FIG. 1 is a diagram illustrating an exemplary environment in which an exemplary embodiment of multi-tiered networks and resource utilization-based provisioning service may be implemented.

The following detailed description refers to the accompanying drawings. The same reference numbers in different drawings may identify the same or similar elements. Also, the following detailed description does not limit the invention.

A network should support various use cases, meet various performance metrics, allow for scalability and flexibility, and so forth. MEC servers may provide various services and applications to end devices with minimal latency because of their close proximity to the network edge. However, the network resources of MEC servers are typically expensive due to their limited available resources (e.g., physical, logical, virtual). On the other hand, cloud servers of a data center-based cloud network may provide an abundance of network resources to support various services and applications but suffer from long network latencies due to their distance from the network edge. In this regard, there are technological problems associated with satisfying performance metric requirements associated with services and applications as well as efficiently managing the allocation and utilization of network resources responsive to the demands of end devices.

According to exemplary embodiments, multi-tiered networks and resource utilization-based provisioning service is described. According to an exemplary embodiment, the multi-tiered networks and resource utilization-based provisioning service may be implemented in a multi-tiered MEC network environment that includes multi-tiered MEC networks that each includes MEC servers that are configurable to host services and applications. According to an exemplary implementation, the multi-tiered MEC networks include MEC networks deployed at different proximities to the network edge. For example, in a three-tiered MEC network environment, one tier of the MEC networks may be implemented at the network's edge (e.g., in the access wireless network or proximate to wireless stations (e.g., evolved Node Bs (eNBs), next generation Node Bs (gNBs), femtocell devices, an evolved Long Term Evolution (LTE) (eLTE) eNB, etc.)), another tier may be implemented in an intermediary network between the access network and a core network (e.g., in a backhaul network), and yet another tier may be implemented in the core network (e.g., co-located in the core network or proximate thereto). According to other exemplary implementations, the number of tiered MEC networks may be different (e.g., fewer or additional). Additionally, or alternatively, according to other exemplary implementations, the proximity to the network edge and/or location within a network for a tier of the multi-tiered networks may be different. For example, a tier of the multi-tiered networks may include a network other than a MEC network (e.g., an external network upstream from the core network, such as the Internet, a packet data network, etc.). The multi-tiered MEC network may be based on, for example, different latencies between MEC tiers, different routing between MEC tiers, and/or different networks (e.g., access, backhaul, core, etc.) to which MEC tiers may be co-located or proximate thereto.

According to an exemplary embodiment, a network device includes logic that uses an end device service profile of an end device as a basis for selecting a candidate network and/or a candidate server of the multi-tiered MEC networks to provide a service or an application (also referred to simply as an "application service") to the end device. According to an exemplary implementation, the type of end device (e.g., mobile versus stationary, etc.), the types of application service to which the end device is authorized to access and use, and other attributes of the end device, which may be included in the end device service profile, may be used to identify candidate networks and servers.

According to an exemplary embodiment, the network device calculates various resource utilization factors associated with the provisioning of the application service. For example, the resource utilizations factors may include resource utilization metrics associated with each candidate location (e.g., network resources of candidate network and candidate server), application service preparation (e.g., migration of content, application, service, etc., if not available at the candidate location), transport resources (e.g., resource utilization metrics associated with end device location and mobility), and other resource utilization metrics (e.g., caching, computing, etc.) as described herein.

According to an exemplary embodiment, the network device includes logic that determines whether a threshold performance metric is satisfied by a candidate network and candidate server. According to an exemplary implementation, the threshold performance metric may be latency. For example, latency may be a round trip delay. According to other exemplary implementations, the threshold performance metric may be another type of metric. The threshold performance metric may include one or multiple performance metrics pertaining to the application service to be provisioned.

According to an exemplary embodiment, the network device includes logic that selects a candidate network and server to provision and host the application service such that resource utilization metric may be minimized while the threshold performance metric is satisfied. According to some exemplary implementations, the candidate network and server that yields the least resource utilization while satisfying the threshold performance metric may be selected. According to other exemplary implementations, the candidate network and server that may not yield the least resource utilization (e.g., from among other candidate networks/servers) while satisfying the threshold performance metric may be selected, as described herein.

As a result, the multi-tiered networks and resource utilization-based provisioning service may improve network resource utilization in a network. For example, the provisioning service may select and cause to be provisioned an application service with minimal network resource usage along with satisfaction of performance metric requirements associated with the application service. Additionally, according to some exemplary scenarios, the use of the end device service profile for selection of a candidate network and network device may allow the provisioning service to provision an application service in a predictive manner and minimize latency.

FIG. 1 is a diagram illustrating an exemplary environment 100 in which an exemplary embodiment of the multi-tiered networks and resource utilization-based provisioning service may be implemented. As illustrated, environment 100 includes an access network 105, MEC networks 115-1 through 115-3 (also referred to collectively as MEC networks 115, or individually or generally as MEC network 115), a backhaul network 125, a core network 150, and an external network 160. Access network 105 includes access devices 107, MEC networks 115 include MEC devices 117, backhaul network 125 includes network devices 127, core network 150 includes core devices 155, and external network 160 includes network devices 165. Environment 100 further includes end devices 180 (also referred to individually or generally as end device 180).

The number, the type, and the arrangement of network devices in environment 100, as illustrated and described, are exemplary. The number of end devices 180 is also exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

The number, the type, and the arrangement of networks in environment 100, as illustrated and described, are exemplary. According to an exemplary embodiment, as described herein, environment 100 includes multi-tiered MEC networks (e.g., MEC networks 115).

Environment 100 includes communication links between the network devices, and between end device 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the multi-tiered networks and resource utilization-based provisioning service may use at least one of these planes of communication. Additionally, an interface of a network device (e.g., an interface defined by a standards body, such as Third Generation Partnership Project (3GPP), International Telecommunication Union (ITU), European Telecommunications Standards Institute (ETSI), etc.) may be modified in order to support the communication (e.g., transmission and reception of messages, information elements (IE), attribute value pairs (AVPs), etc.) between network devices and the multi-tiered networks and resource utilization-based provisioning service, as described herein. According to various exemplary implementations, the interface may be a service-based interface or a reference point-based interface.

Access network 105 may include one or multiple networks of one or multiple types and technologies. For example, access network 105 may include a Fourth Generation (4G) RAN, a 4.5G RAN, a 5G RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, and a next generation (NG) RAN. Access network 105 may further include other types of wireless networks, such as a WiFi network, a Worldwide Interoperability for Microwave Access (WiMAX) network, a local area network (LAN), or another type of network that may provide an on-ramp to another network.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technology (RAT), etc.), wireless standards, wireless frequencies/bands, and so forth.

Access network 105 may include different and multiple functional splitting, such as options 1, 2, 3, 4, 5, 6, 7, or 8, plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

Depending on the implementation, access network 105 may include one or multiple types of access devices 107. For example, access devices 107 may be implemented to include an evolved Node B (eNB), a next generation Node B (gNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node (e.g., a WiFi device, a WiMax device, a hot spot device, etc.) that provides a wireless access service.

Edge controller 112 includes a network device that provides the multi-tiered networks and resource utilization-based provisioning service, as described herein. According to an exemplary embodiment, as illustrated, edge controller 112 may operate as a stand-alone network device. According to other exemplary embodiments, edge controller 112 may be implemented as a network device included in access network 105 (e.g., as an access device 107) or in MEC network 115 (e.g., a MEC device 117 of MEC network 115-1, etc.). Edge controller 112 is described further below.

MEC networks 115 include multiple networks of one or multiple network types and technologies. MEC networks 115 provide access to services and applications by end devices 180. According to an exemplary embodiment, MEC networks 115 include a multi-tiered framework in which MEC networks are deployed at different proximities to the network edge (e.g., relative to end devices 180). For example, MEC network 115-1 may be considered one tier, MEC network 115-2 may be considered another tier, and MEC network 115-3 may be considered yet another tier of the multi-tiered network environment. According to an exemplary implementation, MEC network 115-1 may be co-located to access devices 107 of a particular geographic region within access network 105, MEC network 115-2 may be co-located to network devices 127 of backhaul network 125, and MEC network 115-3 may be co-located to core devices 155 of core network 150. In view of this architecture, MEC networks 115-1 may have a lower latency than MEC network 115-2 and MEC network 115-3, as well as network devices 165. Additionally, MEC network 115-2 may have a lower latency than MEC network 115-3 and network devices 165. MEC network 115-3 may have a lower latency than network devices 165.

MEC network 115 may be implemented using one or multiple technologies including, for example, SDN, network function virtualization (NFV), cloud computing, Infrastructure-as-a-Service (IaaS), Platform-as-a-Service (PaaS), Software-as-a-Service (SaaS), or another type of network technology. Depending on the implementation, MEC network 115 may include, for example, virtualized network functions (VNFs), multi-access (MA) applications/services, and/or servers. MEC network 115 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices, network resources (e.g., storage devices, communication links, etc.). For purposes of illustration and description, MEC devices 117 may include the various types of network devices that may be resident in MEC network 115, as described herein.

Backhaul network 125 includes one or multiple networks of one or multiple types and technologies. According to an exemplary implementation, backhaul network 125 includes a backbone network. For example, the backbone network may be implemented as an optical transport network, an ultra-high capacity wireless backhaul network, an Ethernet backhaul network, a dark fiber network, or another suitable architecture (e.g., Internet Protocol (IP)/Multiprotocol Label Switching (MPLS), millimeter wave technology, etc.). Depending on the implementation, backhaul network 125 may include switches, routers, repeaters, various types of optical network elements (e.g., multiplexers, de-multiplexers, switches, transmitters, receivers, etc.), and/or other types of network devices. For purposes of illustration and description, network devices 127 may include the various types of network devices that may be resident in backhaul network 125, as described herein. Backhaul network 125 includes a fronthaul network.

Core network 150 may include one or multiple networks of one or multiple network types and technologies. Core network 150 may include a complementary network of access network 105. For example, core network 150 may be implemented to include an Evolved Packet Core (EPC) of an LTE, an LTE-A network, an LTE-A Pro network, a next generation core (NGC) network, and/or a legacy core network. Depending on the implementation of core network 150, core network 150 may include various network devices, such as for example, a mobility management entity (MME), a packet gateway (PGW), a serving gateway (SGW), a home subscriber server (HSS), an authentication, authorization, and accounting (AAA) server, a policy and charging rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 150 may include additional, different, and/or fewer network devices than those described. For purposes of illustration and description, network devices 155 may include various types of network devices that may be resident in core network 150, as described herein.

External network 160 may include one or multiple networks of one or multiple types and technologies. For example, external network 160 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, or other type of network that hosts an end device application or service. For example, the end device application/service network may provide various applications or services pertaining to broadband access in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation, external network 160 may include various network devices that provide various applications, services, or other type of end device assets, such as servers (e.g., web, application, cloud, etc.), mass storage devices, data center devices, and/or other types of network devices pertaining to various network-related functions. For purposes of illustration and description, network devices 165 may include various types of network devices that may be resident in external network 160, as described herein.

End device 180 may be implemented as a mobile device, a portable device, a stationary device, a device operated by a user, or a device not operated by a user. For example, end device 180 may be implemented as a Mobile Broadband device, a smartphone, a computer, a tablet, a netbook, a phablet, a wearable device, a vehicle support system, a game system, a drone, an Internet of Things (IoT) device, an enhanced MTC device (eMTC) (also known as Cat-M1), a NarrowBand IoT (NB-IoT) device, or some other type of wireless device (e.g., a set top box, a smart television, a music playing device, etc.). According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, network slicing, DC service, and so forth. Additionally, end device 180 may include one or multiple communication interfaces that provide one or multiple (e.g., simultaneous or non-simultaneous) connections via the same or different RATs, frequency bands, etc.

Figure 2A:
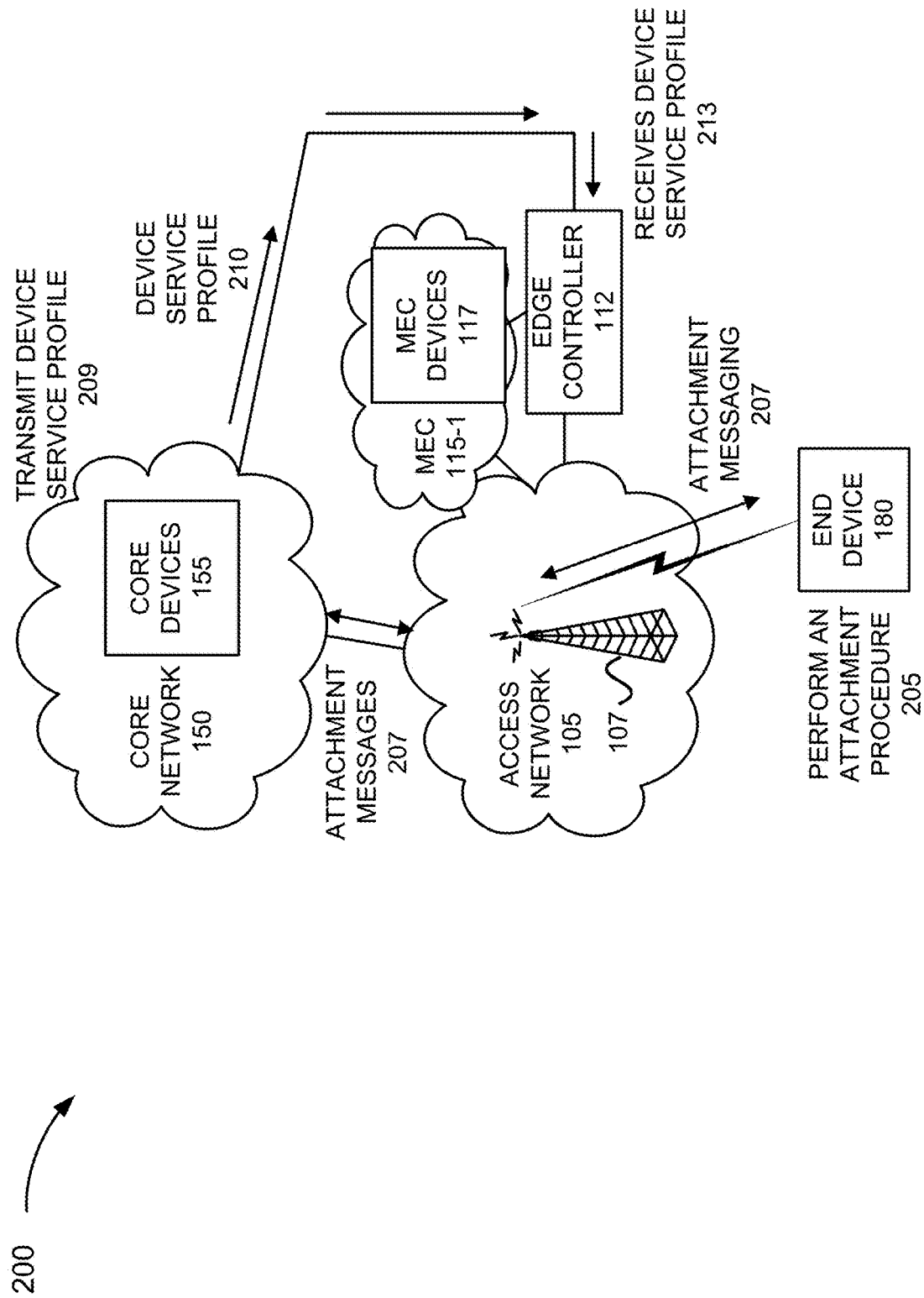

FIGS. 2A-2H are diagrams illustrating an exemplary process of an exemplary embodiment of the multi-tiered networks and resource utilization-based provisioning service. Referring to FIG. 2A, an environment 200, which is consistent with environment 100, is illustrated.

According to an exemplary scenario, assume that end device 180, access network 105, and core network 150 perform an attachment procedure 205. As illustrated, during the performance of the attachment procedure, various types of attachment messaging 207 may be exchanged between end device 180 and the network. According to an exemplary embodiment, during the attachment procedure, core devices 155 may transmit a device service profile 209 of end device 180 to end controller 112. For example, in relation to an LTE network, core device 155 (e.g., an MME or an HSS) may transmit the device service profile to edge controller. According to this scenario, a device service profile 210 may propagate to edge controller 112 without traversing access network 105. According to other exemplary embodiments, although not illustrated, core device 155 may transmit the device service profile to edge controller 112 via access network 105 and/or MEC network 115-1. According to other exemplary embodiments, core device 155 may transmit the device service profile to edge controller 112 subsequent to completion of the attachment procedure. According to yet other exemplary embodiments, end device 180 may transmit the device service profile to edge controller 112. For example, end device 180 may store the device service profile.

According to various exemplary embodiments, device service profile 210 includes information indicating attributes of end device 180 and subscription information. For example, device service profile 210 may indicate a type of end device (e.g., an IoT device, a user device, a category of end device, a class of end device, etc.), whether the end device is a mobile device or a stationary device, and/or other types of information that indicates a characteristic of end device 180. Subscription information may indicate a type, a level, and/or a tier of wireless access/use, control parameters and values relating to quality of service, such as a Maximum Bit Rate (MBR), a Guaranteed Flow Bit Rate (GFBR), a Maximum Flow Bit Rate (MFBR), a Maximum Packet Loss Rate (MPLR), and/or other types of control parameters and values (e.g., packet error rate (PER), Allocation and Retention Priority (ARP), etc.), wireless service access or use restrictions (e.g., data limits, restrictions on time of access, duration of wireless service usage, dual connectivity, access and use of a MEC network, access and use of an application or a service, etc.), application service access or restrictions/ usage, and/or other types of information pertaining to a service (e.g., wireless service, an application service, a MEC service, etc.).

Figure 2B:
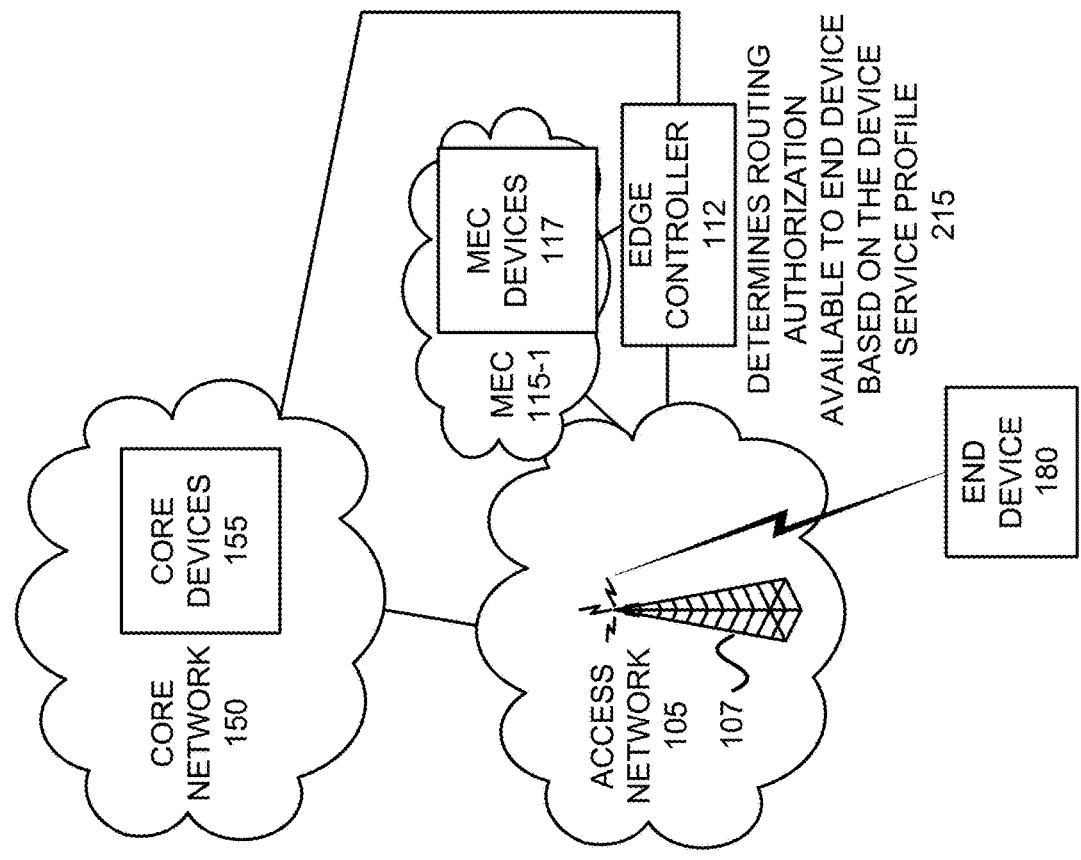

As further illustrated in FIG. 2A, edge controller 112 receives the device service profile 213. Referring to FIG. 2B, in response to obtaining the device service profile, edge controller 112 may determine routing authorization available to end device 180 based on the device service profile 215. For example, an IoT device may not be permitted to access and use a far-edged MEC network (e.g., MEC network 115-1) based on the type of end device, the types of application services used by the IoT device, the tier of subscription pertaining to end device 180, and/or other information included in the device service profile. According to another example, a user device may be permitted to access and use any MEC network (e.g., MEC networks 115-1 through 115-3), and perhaps has a priority to access MEC network 115-1 due to the tier of subscription, the types of application services used by the user device and/or other information included in the device service profile. In this regard, edge controller 112 may determine which network(s) of the multi-tiered networks that end device 180 potentially may access and use based on the device service profile.

Figure 2C:
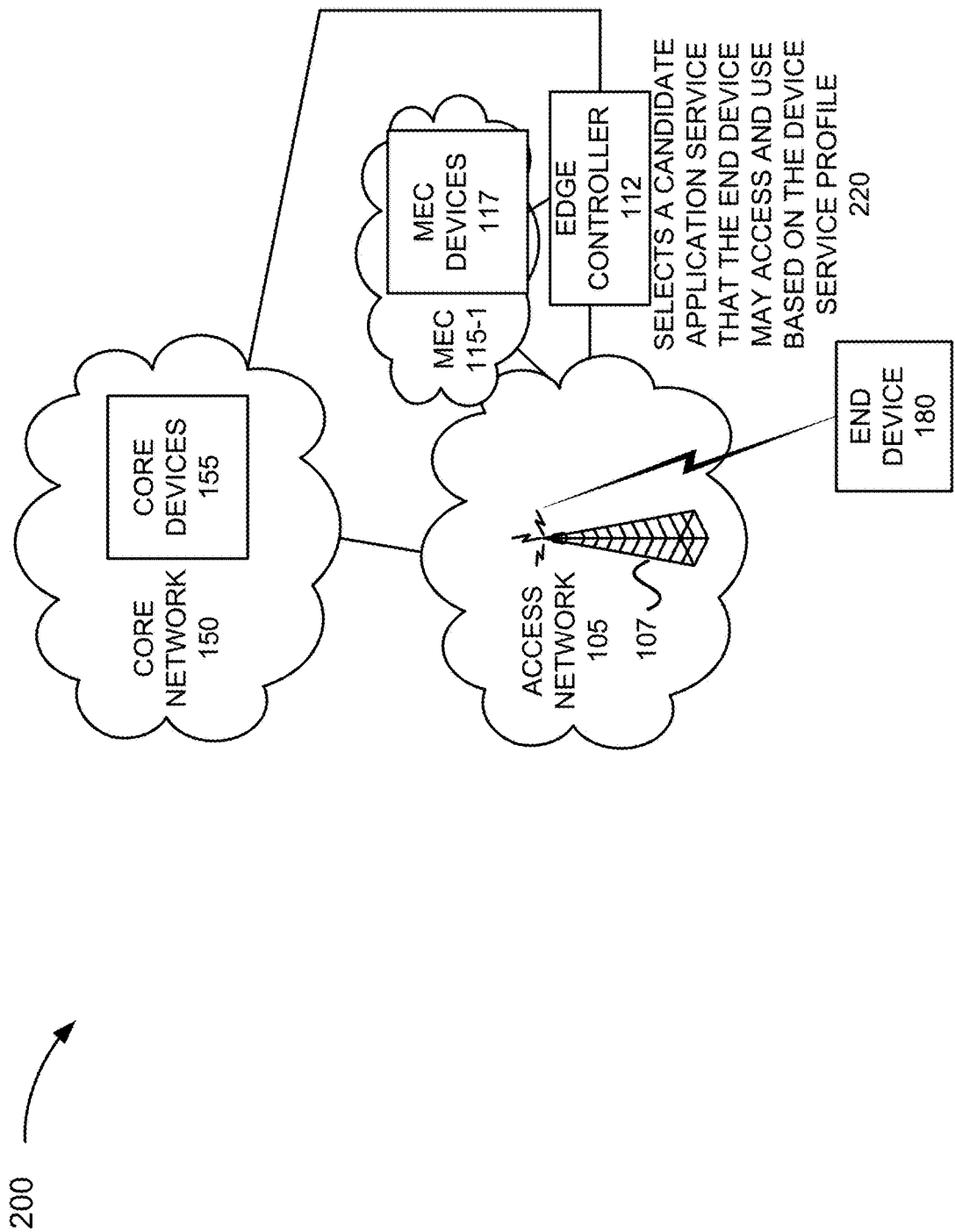

Referring to FIG. 2C, edge controller 112 may select a candidate application service that end device 180 may access and use based on the device service profile 220. For example, the device service profile may indicate one or multiple application services that end device 180 may access and use. According to some exemplary implementations, the device service profile may include historical information relating to previous attachments and applications or services used. According to other exemplary implementations, end device 180 may be limited to access and use a set of applications or services based on its subscription. According to still other examples, edge controller 112 may select the candidate application service in response to receiving a request for the application service from end device 180.

Referring to FIG. 2D, edge controller 112 may select a candidate location to host the candidate service based candidate host network information 225. According to an exemplary embodiment, edge controller 112 may store a database or another type of data repository or data structure that stores information that allows edge controller 112 to determine which, if any, network of the multi-tiered networks, may host the candidate service. According to another exemplary embodiment, although not illustrated, the candidate host network information may be stored by another network device. An exemplary embodiment of candidate host network information is described further below.

Figure 3:
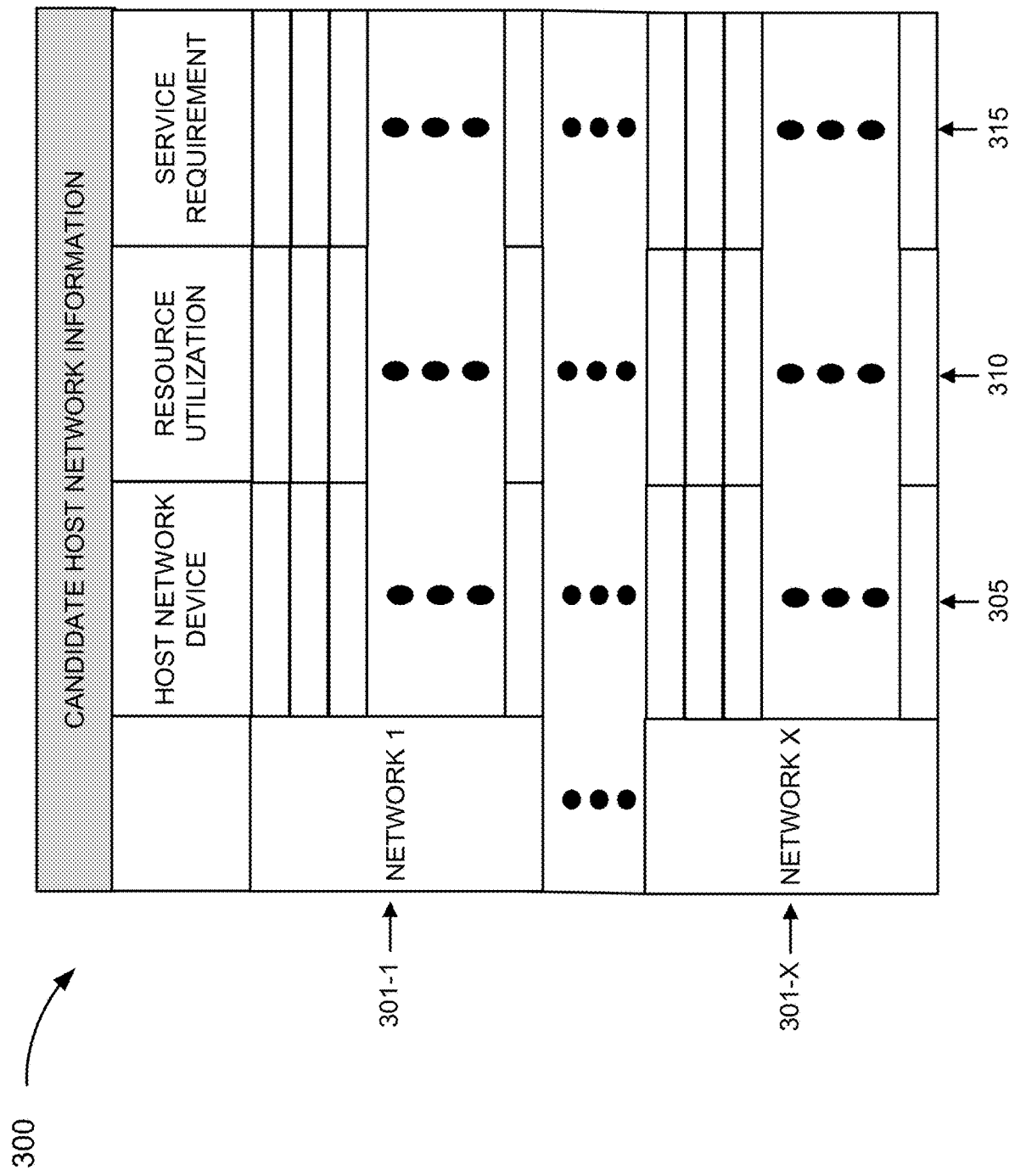
FIG. 3 is a diagram of exemplary candidate host network information.

FIG. 3 is a diagram illustrating exemplary candidate host network information that may be stored in a table 300. As illustrated, table 300 may include a host network device field 305, a resource utilization field 310, and a service requirement field 315. As further illustrated, table 300 includes network fields 301-1 through 301-X (also referred to as network fields 301, or individually or generally as network field 301) that each includes a grouping of fields 305, 310, and 315. Candidate host network information is illustrated in tabular form merely for the sake of description. In this regard, candidate host network information may be implemented in a data structure different from a table.

Network field 301 may store data that indicates a network. For example, as illustrated, network fields 1 through X may indicate a network 1 through a network X. According to other examples, network field 301 may store another type of unique network identifier. According to some exemplary embodiments, network fields 301 may indicate only MEC networks (e.g., MEC network 115-1 through 115-3 or some other number of MEC networks) of the multi-tiered network environment. According to other exemplary embodiments, network fields 301 may indicate MEC networks and other types of networks (e.g., external network 160).

Host network device field 305 may store data that indicates information pertaining to network devices included in the network identified in network field 301. For example, host network device field 305 may indicate an application service that may be provisioned or hosted on a network device. Host network device field 305 may store data indicating a network address (e.g., an Internet Protocol (IP) address, etc.) of the network device and/or a unique identifier of the network device. Host network device field 305 may store other types of data pertaining to the network device, such as configuration information relating to protocols supported by the network device, types of end devices that the network device is configured to serve, and/or other information relating to the capabilities of the network device.

Resource utilization field 310 may store data indicating resource utilization metrics associated with provisioning the application service by a network and network device. According to an exemplary embodiment, the provisioning of the application service may include resource utilization metrics pertaining to preparation of the application service to the candidate network/network device when the application service is not available. For example, the resource utilization metric may relate to the preparation to provision, and may include obtaining content from a location remote from the network, network resources to use to spin up a virtual function, and/or another type of preparatory resource utilization that may be needed. According to an exemplary embodiment, the provisioning of the application service may include resource utilization metrics associated with the actual providing of the application service. For example, resource utilization field 310 may indicate a utilization value pertaining to a network resource (e.g., physical, virtual, logical) of the network device, a communication link, or both, that is used during an application service session. According to another exemplary embodiment, the provisioning of the application service may include resource utilization factors associated with migration of the application service to another network and network device. For example, when end device 180 is a mobile device, the provisioning of the application service may migrate from one network to another network due to the mobility and change in location of end device 180. By way of one example, content and/or context information may need to be copied between two MEC networks 115. Resource utilization field 310 may store network resource utilization parameters and values associated with the tracking of end device 180 and the migration of the application service, computational and caching resource utilizations, resource utilizations associated with communication links, intermediary devices (e.g., routers, etc.) and so forth.

According to an exemplary embodiment, although not illustrated, resource utilization field 310 may be updated, by a network device, with resource utilization parameter and values stored by resource utilization field 310. For example, the network device may monitor congestion levels, available network resources, etc., of a network and network device of the multi-tiered network environment. Based on the monitoring and analysis, a resource utilization value may be updated (e.g., in real-time). According to another exemplary embodiment, a resource utilization parameter and value may be relatively static and may not require updating.

Service requirement field 315 may store data indicating a performance metric and value stemming from the provisioning of the application service by the network and network device. According to an exemplary embodiment, the performance metric and value include latency. For example, MEC devices 117 of MEC networks 115-1 may yield a lower latency than MEC devices 117 of MEC network 115-2; MEC devices 117 of MEC network 115-2 may yield a lower latency than MEC devices 117 of MEC network 113; and MEC devices 117 of MEC network 115-3 may yield a lower latency than network devices 165 of external network 160. According to some implementations, different host network devices (e.g., MEC devices 117) within the same network (e.g., MEC network 115-1, etc.) may yield different latencies based on various factors, such as routing within the MEC network or another reason. According to another exemplary embodiment, the performance metric and value may not include latency. For example, the performance metric may relate to packet loss, throughput, and/or another type of network performance metric.

According to other exemplary implementations, table 300 may store additional, fewer, and/or different instances of candidate host network information in support of the multi-tiered networks and resource utilization-based provisioning service, as described herein.

As previously described, referring back to FIG. 2D, edge controller 112 may select one or multiple candidate locations (e.g., network(s) and host network device (s)) to host the candidate service based on the candidate host network information 225. For example, edge controller 112 may identify a network and host network device that may be used to provision the candidate service based on network field 301 and host network device 305.

Figure 2E:
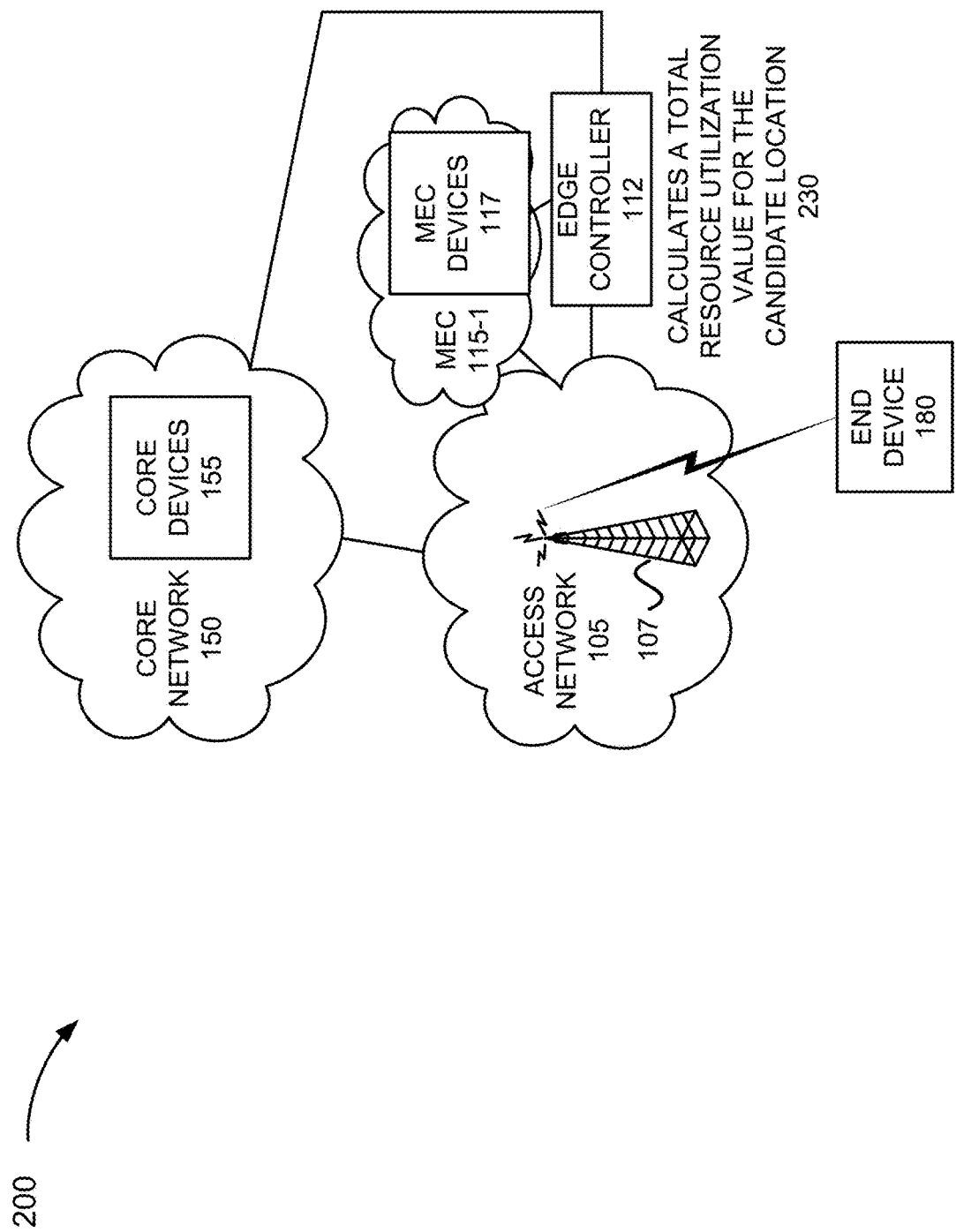

Referring to FIG. 2E, edge controller 112 may calculate a total resource utilization value for the candidate location 230. For example, edge controller 112 may calculate a total resource utilization value for the candidate location based on resource utilization field 310. Edge controller 112 may calculate the total resource utilization value based on other information (e.g., device service profile, etc.). For example, the total resource utilization value associated with the provisioning of application service A to end device 180 that is a mobile device may be different from the provisioning of application service A to end device 180 that is a stationary device.

Figure 2F:
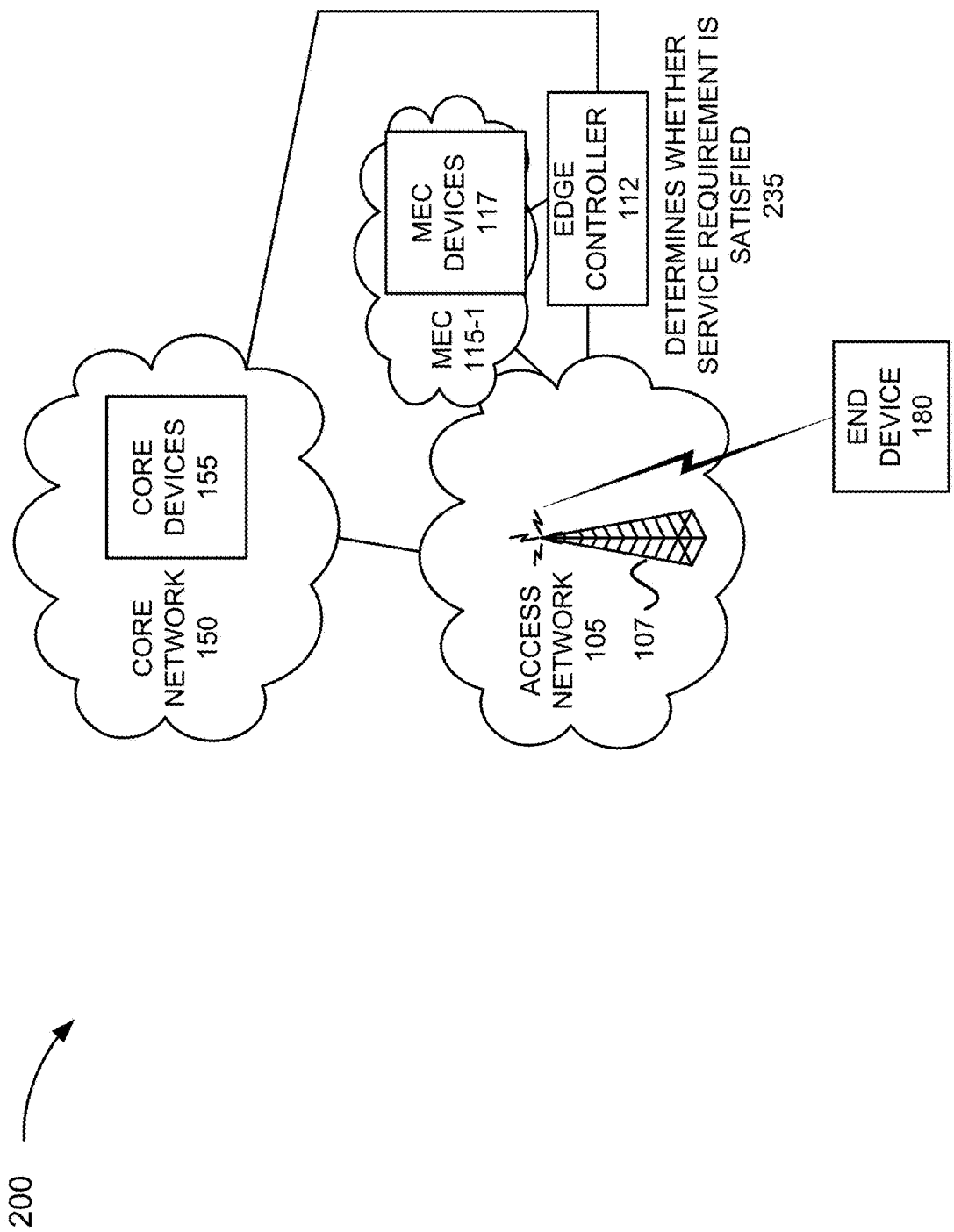

Referring to FIG. 2F, edge controller 112 may determine whether a performance metric requirement satisfies a threshold service requirement 235. For example, edge controller 112 may compare a performance metric parameter and value stored in service requirement field 315 with the threshold service requirement. The threshold service requirement may be implemented as an administratively configured minimum service requirement parameter and value pertaining to the candidate service. For example, an extreme real-time application communication service may need to satisfy a threshold level of latency and/or another type of performance metric/value. Referring to FIG. 1, for example, MEC networks 115-1 may be a tier of the multi-tier network environment that can satisfy such a latency requirement by virtue of their proximity to the network edge compared to MEC networks 115-2 and 115-3, and network devices 165 of external network 160, as previously described.

According to an exemplary embodiment, edge controller 112 may consider the total resource utilization value of a candidate location and the whether the performance metric requirement of the candidate location satisfies the threshold service requirement. For example, edge controller 112 may filter one or multiple candidate locations based on the following exemplary expression:

$$S_j = \min\{C_i, i=1 \ldots N\}, \text{ while } P_i < P_T \qquad (1),$$

in which $S_j$ indicates an application service; $C_i$ indicates a total resource utilization value associated with the candidate location; $P_i$ indicates a performance metric and value associated with the candidate location; and $P_T$ indicates a threshold performance metric and value.

Figure 2G:
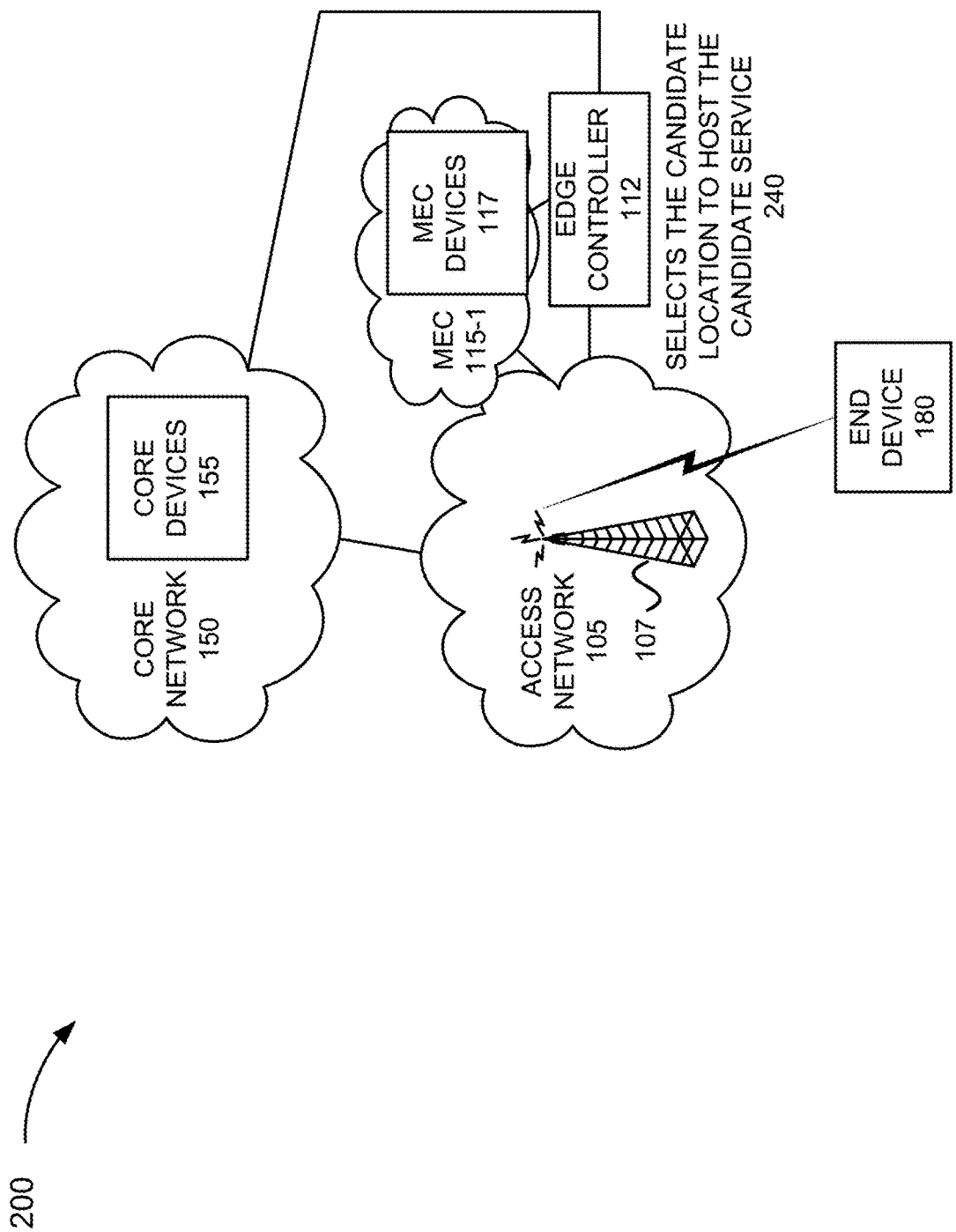

Referring to FIG. 2G, edge controller 112 may select a candidate location to host the candidate service. According to an exemplary embodiment, edge controller 112 may select a candidate location that has the least total resource utilization value (e.g., relative to other candidate location(s)) and satisfies the threshold service requirement. According to other exemplary embodiments, edge controller 112 may not select the candidate location that has the least total resource utilization value and satisfies the threshold service requirement. For example, based on the device service profile, edge controller 112 may select a candidate location that has a greater total resource utilization value than another candidate location because of the tier of subscription associated with end device 180. For example, MEC device 117 of MEC network 115-1 may have a greater total resource utilization value compared to MEC device 117 of MEC network 115-2, but edge controller 112 selects MEC device 117 of MEC network 115-1 because end device 180 has the highest tier of wireless access service. According to other examples, edge controller 112 may not select the candidate location that has the least total resource utilization value and satisfies the threshold service requirement because of other types of information. For example, network state information (e.g., congestion levels, etc.) relating to access network 105 and/or core network 105 may be considered that would cause edge controller 112 to make such a determination.

Referring to FIG. 2H, edge controller 112 may invoke the provisioning of the candidate service at the selected candidate location 250. For example, edge controller 112 may transmit a provisioning message 255 to one of the MEC networks 115 (e.g., MEC network 115-1, MEC network 115-2, or MEC network 115-3). Provisioning message 255 may indicate the application service to be provisioned. Provisioning message 255 may include other types of information (e.g., device service profile of end device 180). MEC network 115 may receive the provisioning message, and partially, or fully provision the application service. Depending on the exemplary scenario, MEC network 115 may provision a server to host the application service, provision core network functions, obtain content, etc.

Although FIGS. 2A-2H illustrate an exemplary process of the cell selection management service, according to other exemplary embodiments, the process may include additional, different, and/or fewer steps, and/or include additional, different, and/or fewer messages.

Figure 4:
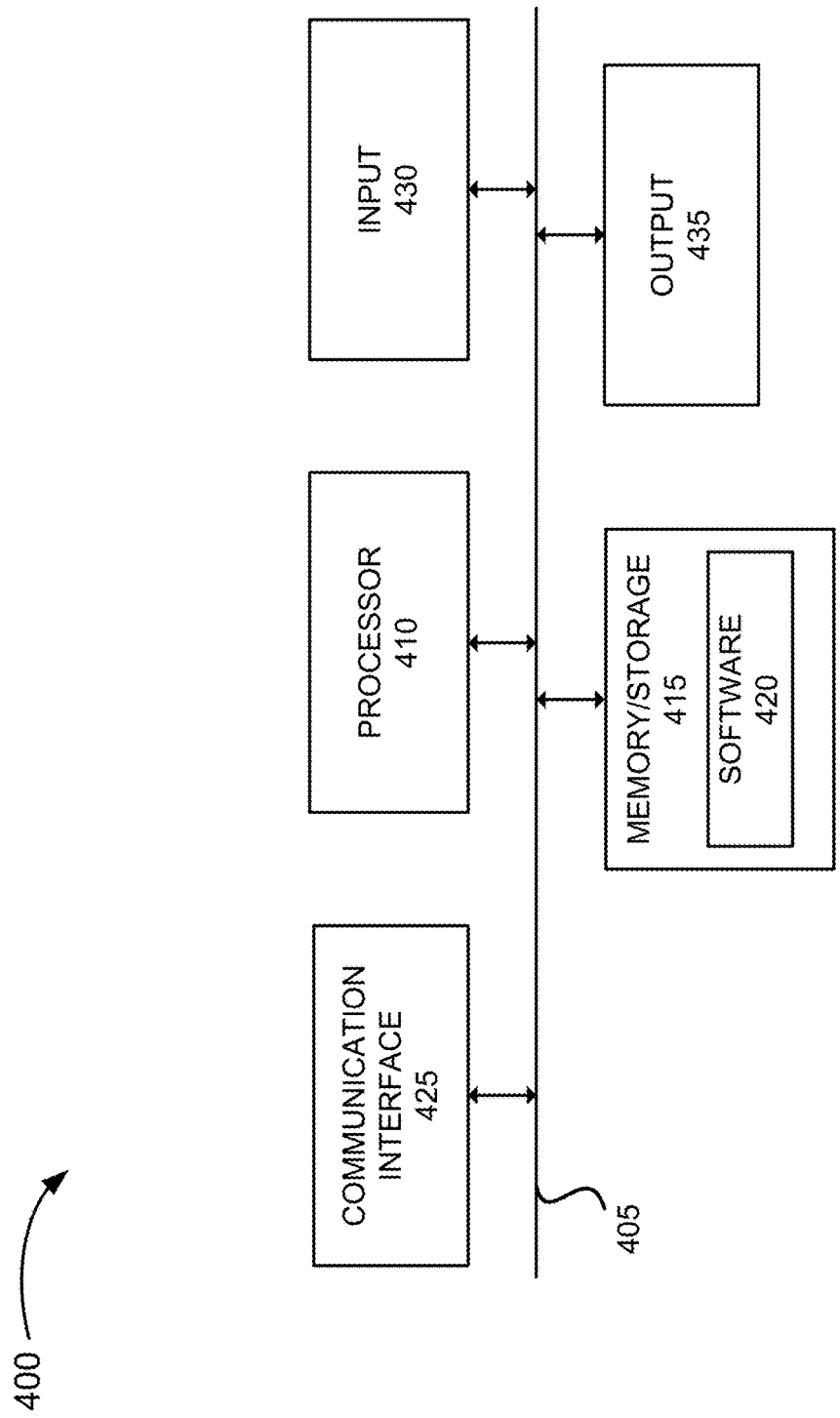
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to components included in edge controller 112, access devices 107 of access network 105, MEC devices 117 of MEC networks 115, network devices 127 of backhaul network 125, core devices 155 of core network 150, network devices 165 of external network 160, and end device 180. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with respect to edge controller 112, software 420 may include an application that, when executed by processor 410, provides a function of the multi-tiered networks and resource utilization-based provisioning service, as described herein. Additionally, with reference to MEC devices 117, core devices 155, or another network device, software 420 may include an application that, when executed by processor 410, provides a function of the multi-tiered networks and resource utilization-based provisioning service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
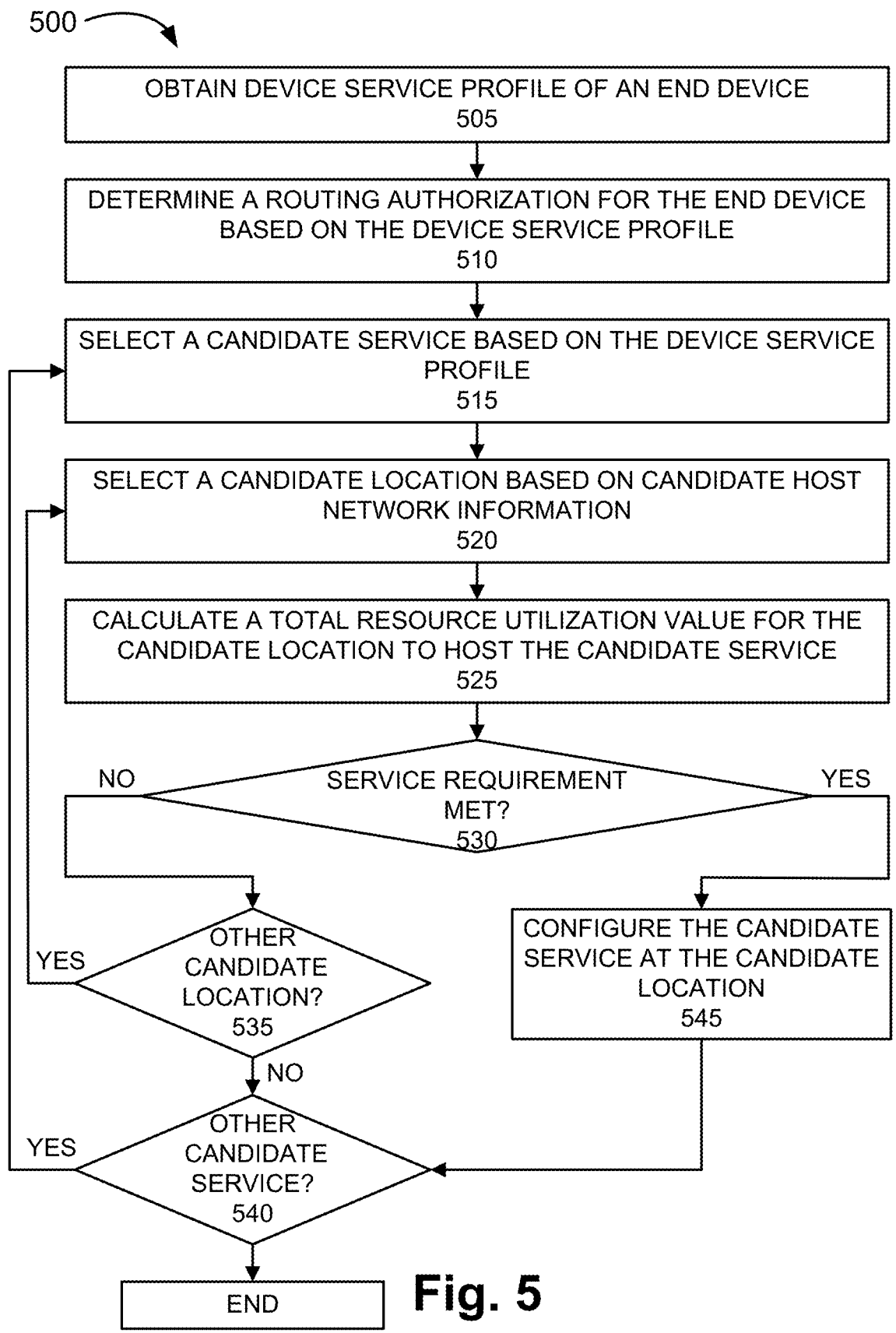
FIG. 5 is a flow diagram illustrating an exemplary process of exemplary embodiment of the multi-tiered networks and resource utilization-based provisioning service.

FIG. 5 is a flow diagram illustrating an exemplary process 500 of an exemplary embodiment of the multi-tiered networks and resource utilization-based provisioning service. According to an exemplary embodiment, edge controller 112 performs steps of process 500. For example, processor 410 executes software 420 to perform a step illustrated in FIG. 5 and described herein. Additionally, or alternatively, a step illustrated in FIG. 5 may be performed by execution of only hardware.

In block 505, a device service profile of an end device may be obtained. For example, edge controller 112 may obtain the device service profile during an attachment procedure or subsequent thereto (e.g., in response to an application service request from end device 180). In block 510, a routing authorization for the end device may be determined based on the device service profile. For example, edge controller 112 may determine which networks of the multi-tiered networks may be accessed and used for an application service by end device 180. In block 515, a candidate service may be selected based on the device service profile.

In block 520, a candidate location may be selected based on the candidate service and candidate host network information. For example, edge controller 112 may use network host information to select candidate locations. In block 525, a total resource utilization value for the candidate location to host the candidate service may be calculated. For example, edge controller may calculate a total resource utilization value for provisioning the application service at the candidate location. In block 530, it is determined whether a service requirement is satisfied. For example, edge controller 112 may determine whether a performance metric and value pertaining to the candidate location satisfies a threshold performance metric and value. When it is determined that the service requirement is not met (block 530—NO), it may be determined whether another candidate location is to be considered (block 535). For example, edge controller 112 may determine whether another candidate location is available to host the candidate application service based on the network host information. When it is determined that another candidate location may be considered (block 535—YES), process 500 may continue to block 520. When it is determined that another candidate location may not be considered (block 535—NO), it may be determined whether another candidate service may be considered (block 540). For example, edge controller 112 may select one of the candidate locations to host the candidate service. Additionally, edge controller 112 may determine whether another candidate service should be analyzed based on the device service profile of end device, or based on an application service request received from end device 180.

When it is determined that another candidate service may be considered (block 540—YES), process 500 may continue to block 515. When it is determined that another candidate service may not be considered (block 540—NO), process 500 may end.

When it is determined that the service requirement is met (block 530—YES), the candidate service may be configured at the candidate location (block 545). For example, edge controller 112 may select the candidate location that satisfies the service requirement and has the least total resource utilization value, or another candidate location (e.g., which may not have the least total resource utilization value), as previously described. Edge controller 112 may invoke a provisioning of the candidate service at the selected location. For example, edge controller 112 may transmit a provisioning message to the selected location (e.g., MEC network). Process 500 may continue to block 540.

Although FIG. 5 illustrates an exemplary process 500 of the multi-tiered networks and resource utilization-based provisioning service, according to other embodiments, process 500 may include additional operations, fewer operations, and/or different operations than those illustrated in FIG. 5, and described herein. For example, in reference to block 530—YES, when it is determined that the service requirement is satisfied, edge controller 112 may continue to block 535. In this regard, edge controller 112 may cycle through each candidate location, store each total resource utilization value and service requirement associated therewith, and select the optimal candidate location. Thereafter, edge controller 112 may continue to block 545.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to processes illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:

receiving, by a network device of a multi-tiered mobile edge computing network, a device service profile pertaining to an end device, wherein the multi-tiered mobile edge computing network comprises multiple mobile edge computing networks that are multi-tiered based on different latencies and different distances from a network edge;

determining, by the network device in response to the receiving, a routing authorization for the end device based on the device service profile, wherein the routing authorization indicates which of the mobile edge computing networks of the multi-tiered mobile edge computing network the end device is authorized to access;

selecting, by the network device, a candidate application service of the end device based on the device service profile;

selecting, by the network device, one or multiple candidate locations of the multi-tiered mobile edge computing network to host the candidate application service based on the routing authorization;

calculating, by the network device, a total resource utilization associated with a provisioning of the candidate application service at each of the one or multiple candidate locations;

determining, by the network device, which of the one or multiple candidate locations satisfy a threshold performance metric value pertaining to the candidate application service;

selecting, by the network device in response to the determining which, one of the one or multiple candidate locations to provision the candidate application service; and causing, by the network device, the one of the one or multiple candidate locations to provision the candidate application service.

2. The method of claim 1, wherein the calculating further comprises:
calculating, by the network device, the total resource utilization associated with the provisioning of the candidate application service at each of the one or multiple candidate locations based on the device service profile.

3. The method of claim 1, wherein the one of the one or multiple candidate locations has a least total resource utilization relative to any other of the one or multiple candidate locations.

4. The method of claim 1, wherein determining which of the one or multiple candidate locations satisfy the threshold performance metric comprises:
comparing, by the network device, the threshold performance metric value to a performance metric value associated each of the one or multiple candidate locations; and
determining, by the network device in response to the comparing, which of the one or multiple candidate locations satisfy the threshold performance metric value.

5. The method of claim 1, wherein the threshold performance metric value includes a threshold latency value, and wherein the total resource utilization includes resource utilization associated with network resources used for content preparation, transportation associated with the end device location and mobility, and caching and computing related to the candidate application service.

6. The method of claim 1, further comprising:
storing, by the network device, information indicating candidate application services that can be provisioned for each of the one or multiple candidate locations, resource utilization associated with each of the candidate application services, and a performance metric value associated with each of the candidate application services; and
using, by the network device, the information for selecting the one or multiple candidate locations, for calculating the total resource utilization, and for determining which of the one or multiple candidate locations satisfy the threshold performance metric value.

7. The method of claim 1, wherein determining
which of the one or multiple candidate locations satisfy the threshold performance metric value further comprises:
determining, by the network device, which of the one or multiple candidate locations satisfy the threshold performance metric value for multiple candidate host devices of each mobile edge computing network.

8. The method of claim 1, wherein the receiving comprises:
receiving, by the network device, the device service profile during an attachment procedure between the end device and an access network and a core network of the multi-tiered mobile edge computing network, wherein the network device resides in one of multiple mobile edge computing networks of the multi-tiered mobile edge computing network.

9. A network device of a multi-tiered mobile edge computing network comprising:
a communication interface;
a memory, wherein the memory stores instructions; and
a processor, wherein the processor executes the instructions to:
receive, via the communication interface, a device service profile pertaining to an end device, wherein the multi-tiered mobile edge computing network comprises multiple mobile edge computing networks that are multi-tiered based on different latencies and different distances from a network edge;
determine, in response to the receipt of the device service profile, a routing authorization for the end device based on the device service profile, wherein the routing authorization indicates which of the mobile edge computing networks of the multi-tiered mobile edge computing network the end device is authorized to access;
select a candidate application service of the end device based on the device service profile;
select one or multiple candidate locations of the multi-tiered mobile edge computing network to host the candidate application service based on the routing authorization;
calculate a total resource utilization associated with a provisioning of the candidate application service at each of the one or multiple candidate locations;
determine which of the one or multiple candidate locations satisfy a threshold performance metric value pertaining to the candidate application service;
select in response to the determination which, one of the one or multiple candidate locations to provision the candidate application service; and
cause the one of the one or multiple candidate locations to provision the candidate application service.

10. The network device of claim 9, wherein, when calculating, the processor further executes the instructions to:
calculate the total resource utilization associated with the provisioning of the candidate application service at each of the one or multiple candidate locations based on the device service profile.

11. The network device of claim 9, wherein the one of the one or multiple candidate locations has a least total resource utilization relative to any other of the one or multiple candidate locations.

12. The network device of claim 9, wherein, when determining which of the one or multiple candidate locations satisfy the threshold performance metric, the processor further executes the instructions to:
compare the threshold performance metric value to a performance metric value associated each of the one or multiple candidate locations; and
determine, in response to the comparison, which of the one or multiple candidate locations satisfy the threshold performance metric value.

13. The network device of claim 9, wherein the threshold performance metric value includes a threshold latency value, and wherein the total resource utilization includes resource utilization associated with network resources used for content preparation, transportation associated with the end device location and mobility, and caching and computing related to the candidate application service.

14. The network device of claim 9, wherein the processor further executes the instructions to:
store information indicating candidate application services that can be provisioned for each of the one or multiple candidate locations, resource utilization associated with each of the candidate application services, and a performance metric value associated with each of the candidate application services; and
use the information for selecting the one or multiple candidate locations, for calculating the total resource utilization, and for determining which of the one or multiple candidate locations satisfy the threshold performance metric value.

15. The network device of claim 9, wherein, when determining which of the one or multiple candidate locations satisfy the threshold performance metric value, the processor further executes the instructions to:
   determine which of the one or multiple candidate locations satisfy the threshold performance metric value for multiple candidate host devices of each mobile edge computing network.

16. The network device of claim 9 wherein, when receiving, the processor further executes the instructions to:
   receive, via the communication interface, the device service profile during an attachment procedure between the end device and an access network and a core network of the multi-tiered mobile edge computing network, wherein the network device resides in one of multiple mobile edge computing networks of the multi-tiered mobile edge computing network.

17. A non-transitory computer-readable storage medium storing instructions executable by a processor of a network device of a multi-tiered mobile edge computing network, which when executed cause the network device to:
   receive a device service profile pertaining to an end device, wherein the multi-tiered mobile edge computing network comprises multiple mobile edge computing networks that are multi-tiered based on different latencies and different distances from a network edge;
   determine, in response to the receipt of the device service profile, a routing authorization for the end device based on the device service profile, wherein the routing authorization indicates which of the mobile edge computing networks of the multi-tiered mobile edge computing network the end device is authorized to access;
   select a candidate application service of the end device based on the device service profile;
   select one or multiple candidate locations of the multi-tiered mobile edge computing network to host the candidate application service based on the routing authorization;
   calculate a total resource utilization associated with a provisioning of the candidate application service at each of the one or multiple candidate locations;
   determine which of the one or multiple candidate locations satisfy a threshold performance metric value pertaining to the candidate application service;
   select in response to the determination which, one of the one or multiple candidate locations to provision the candidate application service; and
   cause the one of the one or multiple candidate locations to provision the candidate application service.

18. The non-transitory computer-readable storage medium of claim 17, wherein the instructions to calculate further comprise instructions, which when executed cause the network device to:
   calculate the total resource utilization associated with the provisioning of the candidate application service at each of the one or multiple candidate locations based on the device service profile.

19. The non-transitory computer-readable storage medium of claim 17, wherein the instructions further comprise instructions, which when executed cause the network device to:
   store information indicating candidate application services that can be provisioned for each of the one or multiple candidate locations, resource utilization associated with each of the candidate application services, and a performance metric value associated with each of the candidate application services; and
   use the information for selecting the one or multiple candidate locations, for calculating the total resource utilization, and for determining which of the one or multiple candidate locations satisfy the threshold performance metric value.

20. The non-transitory computer-readable storage medium of claim 17, wherein the threshold performance metric value includes a threshold latency value.

* * * * *